United States Patent
Loi et al.

(10) Patent No.: US 8,496,184 B2
(45) Date of Patent: Jul. 30, 2013

(54) METHOD AND APPARATUS FOR PACKAGING SURFACE ACOUSTIC WAVE TRANSPONDER FOR DOWN-HOLE APPLICATIONS

(75) Inventors: Duke Loi, Frisco, TX (US); Tim Mueller, Plano, TX (US); Kathleen Hanafan, Sugar Land, TX (US)

(73) Assignee: HM Energy LLC, Sugar Land, TX (US)

( * ) Notice: Subject to any disclaimer, the term of this patent is extended or adjusted under 35 U.S.C. 154(b) by 0 days.

(21) Appl. No.: 13/188,748

(22) Filed: Jul. 22, 2011

(65) Prior Publication Data

US 2012/0018524 A1 Jan. 26, 2012

Related U.S. Application Data

(60) Provisional application No. 61/366,792, filed on Jul. 22, 2010, provisional application No. 61/366,784, filed on Jul. 22, 2010, provisional application No. 61/436,918, filed on Jan. 27, 2011.

(51) Int. Cl.
*G06K 19/00* (2006.01)
(52) U.S. Cl.
USPC .......................................... 235/492; 235/487
(58) Field of Classification Search
USPC .................. 235/487, 492; 340/10, 572
See application file for complete search history.

(56) References Cited

U.S. PATENT DOCUMENTS

| | | | |
|---|---|---|---|
| 2005/0035829 A1* | 2/2005 | Umeda et al. | 333/191 |
| 2005/0104685 A1 | 5/2005 | Kuroki et al. | |
| 2005/0237130 A1 | 10/2005 | Iwamoto et al. | |
| 2005/0264423 A1* | 12/2005 | Hartmann | 340/572.8 |
| 2007/0023185 A1 | 2/2007 | Hall et al. | |
| 2009/0051246 A1* | 2/2009 | Mueller | 310/313 R |

OTHER PUBLICATIONS

Patent Cooperation Treaty; Korean Intellectual Property Office; International Search Report of PCT/US2011/044976; Han Jae Guyn; Feb. 23, 2012; 3 pages.

\* cited by examiner

*Primary Examiner* — Michael G Lee
*Assistant Examiner* — Matthew Mikels
(74) *Attorney, Agent, or Firm* — Howison & Arnott, L.L.P.

(57) ABSTRACT

A method and apparatus for packaging a surface acoustic wave transponder for use in harsh environments is provided. An exemplary transponder comprises a surface acoustic wave piezoelectric device, wire bonds, an antenna element, an antenna substrate, a dome structure, and casing. The exemplary surface acoustic wave piezoelectric device is attached directly onto the antenna substrate and wire bonded to an antenna element. The surface acoustic wave piezoelectric device is protected under the dome structure, which is sealed and attached to the antenna substrate. The components are encased and sealed within a transponder casing. The transponder may be part of or incorporated into substantially any shape or form factor.

18 Claims, 4 Drawing Sheets

METHOD AND APPARATUS FOR PACKAGING SURFACE ACOUSTIC WAVE TRANSPONDER FOR DOWN-HOLE APPLICATIONS

CROSS-REFERENCE TO RELATED APPLICATIONS

This application claims benefit from of U.S. Provisional Application No. 61/366,792, filed Jul. 22, 2010, entitled METHOD AND APPARATUS FOR PACKAGING SURFACE ACOUSTIC WAVE TRANSPONDER FOR HARSH ENVIRONMENT; this application also claims benefit from U.S. Provisional Application No. 61/366,784, filed Jul. 22, 2010, entitled METHOD AND APPARATUS FOR PACKAGING SURFACE ACOUSTIC WAVE TRANSPONDER FOR DOWN-HOLE APPLICATIONS; this application also claims benefit from U.S. Provisional Application No. 61/436,918, filed Jan. 27, 2011, entitled METHOD AND APPARATUS FOR PACKAGING SURFACE ACOUSTIC WAVE TRANSPONDER FOR DOWN-HOLE TOOLS, the specifications of which are incorporated herein in by reference.

This application is related to U.S. patent application Ser. No. 13/085,996, filed Apr. 8, 2011, entitled SURFACE ACOUSTIC WAVE TRANSPONDER PACKAGE FOR DOWN-HOLE APPLICATIONS, which claims benefit from U.S. Provisional Application No. 61/366,792, filed Jul. 22, 2011, entitled METHOD AND APPARATUS FOR PACKAGING SURFACE ACOUSTIC WAVE TRANSPONDER FOR HARSH ENVIRONMENT, the specifications of which are incorporated herein by reference.

TECHNICAL FIELD

Embodiments of the invention relate to a method, device and apparatus associated with packaging an identification tag circuit for installment on equipment assets used in oil and gas down-hole applications as well as on above-ground assets, equipment and tools. More specifically, embodiments of the invention relate to methods and apparatus for packaging Surface Acoustic Wave (SAW) Radio Frequency Identification (RFID) transponders in a durable manner so as to be useful in tagging, identifying and tracking equipment assets used in oil and gas down-hole and/or above-ground equipment and tools.

BACKGROUND

Oil exploration companies involved in drilling, completion and production phases of oil and gas well installation use hundreds, if not thousands, of down-hole tools such as tubulars, drill bits, mud motors, power packs, etc. while drilling, exploring and completing oil and gas wells. Furthermore, much of the equipment required for oil exploration is found above-ground. Such above-ground equipment and assets include, but are not limited to, hand and portable powered tools, pipe systems, computer controlled machinery, hydraulic machinery, welding and cutting equipment, torque converters, clutches, transmissions, electric motors, pumps, heavy machinery, various parts and machinery on a derrick, rotary tables, top drive devices, test equipment, blow-out preventers, centrifuges, degassers, desanders, bell nipples, Kelly drives and mud pumps, just to name a few items. Some technologies utilized in the recent past help such oil exploration companies log individual tools into inventory; track usage of individual tools in drilling, completion and production operations; and ultimately record the removal of the individual tools from inventory when their usefulness has expired.

There have been systems created for managing inventories of down-hole tools or above-ground assets that are used in the drilling, completion, and production phases of oil and gas wells. In some such systems, a passive RFID (radio frequency identification) tag is installed on each asset and recorded or logged in inventory. By providing each tool or asset with an RFID tag, the asset can be tracked throughout its useful life. One example of such a system for managing inventories comprising down-hole tools used in drilling, completion and production of oil and gas wells is discussed in US Publication No. 2009/0055293.

U.S. Pat. No. 7,602,106 discloses an RFID piezoelectric device package comprising a plethora of components including a hermetically sealed device header that contains a piezoelectric device, which is then installed into the bottom of the radome along with an RF antenna, along with an impedance matching network and other elements. The drawback of such a device is the manufacturing complexity and the number of parts required to assemble the requisite piezoelectric RFID device.

As such, what is needed is an improved down-hole or above-ground asset tagging device that can withstand the high pressures, high temperatures, rugged and rough environments as well as the acidic and caustic environments that exist in the vicinity of oil and gas wells as well as in down-hole environments.

SUMMARY

Embodiments of the invention provide a new down-hole asset and above-ground asset tagging device package that can withstand the temperatures, pressures, acidic and caustic environments as well as the rough hazardous above-hole environments of oil rigs and platforms found in many varying difficult environments where oil exploration takes place around the world.

An exemplary tagging transponder device in accordance with an embodiment of the invention includes a surface acoustic wave (SAW) piezoelectric device attached directly onto a bottom surface of an antenna substrate by a bonding agent; a dome enclosure positioned over the SAW piezoelectric device, the dome enclosure having a bottom dome edge sealed thereabout to the bottom surface of the antenna substrate such that the SAW piezoelectric device is enclosed therein between the dome enclosure and the bottom surface of the antenna substrate; a predetermined gas about the SAW piezoelectric device and enclosed between or within the dome enclosure and the bottom surface of the antenna substrate; an antenna system covering a portion of a top surface of the antenna substrate; an electrical connection extending from the SAW piezoelectric device, through the antenna substrate and to a portion of the antenna system; and an outer radio frequency transparent material substantially covering the top surface and the bottom surface of antenna substrate as well as the dome enclosure and the antenna system.

In various embodiments, exemplary tagging transponder devices may be adapted for inclusion into a plurality of form factors. The form factors may be adapted for attachment to another device or object.

Other embodiments of an exemplary tagging transponder device comprise an antenna substrate having a top surface and a bottom surface; an antenna layer covering a portion of the top surface, the antenna layer comprising an antenna electrical connection portion; at least one via extending from the antenna electrical connection portion through the antenna substrate to the bottom surface of the antenna substrate; a radio frequency identification device bonded directly to the bottom surface of the antenna substrate adjacent to the at least one via, the radio frequency device comprising at least one bonding wire, the boding wire being electrically connected through the via to the antenna electrical connection portion, the via being sealed with a sealing material; and a dome enclosure covering the radio frequency identification device, the dome enclosure comprising a bottom edge sealed thereabout against the bottom surface.

Additional embodiments have a radio frequency transparent material that covers the top surface and the antenna layer, the radio frequency transparent material further covering the bottom surface and the dome enclosure.

Furthermore, various embodiments of the invention provide a SAW piezoelectric tagging transponder device comprising an antenna substrate comprising a top surface and a bottom surface; a first antenna portion comprising a first electrical connection portion on the top surface of the antenna substrate; a second antenna portion comprising a second electrical connection portion on the top surface of the antenna substrate, the first electrical connection portion being proximate to the second electrical connection portion; a SAW piezoelectric tagging device comprising a first connection wire and a second connection wire, the SAW piezoelectric tagging device being bonded to the bottom surface of the antenna substrate; a first via extending through the antenna substrate, the first via being proximate to and electrically connected to the first connection wire, the first via further being electrically connected to the first electrical connection portion of the first antenna portion, the first via being filled with a material adapted to establish a gas tight seal; a second via extending through the antenna substrate, the second via being proximate to and electrically connected to the second electrical connection portion of the second antenna portion, the second via being filled with the material adapted to establish a gas tight seal; a dome structure covering the SAW piezoelectric tagging device, the first via and the second via, the dome structure having a bottom edge that is bonded to the bottom surface of the antenna substrate with a gas tight seal; and a predetermined gas contained between the dome structure and the antenna substrate.

BRIEF DESCRIPTION OF THE DRAWINGS

A more complete understanding of the methods and embodiments associated with the present invention may be obtained by reference to the following detailed description when taken in conjunction with the accompanying drawings wherein.

DETAILED DESCRIPTION

Referring now to the drawings, wherein like reference numbers are used herein to designate like elements throughout, the various views and embodiments of an exemplary tagging transponder device or surface acoustic wave transponder package, which can be used for down-hole applications or above-ground oil and gas exploration applications are illustrated and described.

Additionally, other possible embodiments are described or alluded to. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Transponders that can withstand extreme environmental conditions of pressure, temperature and caustic chemicals are critical in certain industries, such as oil and gas exploration, deep ocean exploration, space exploration and mining. Embodiments of the present exemplary tagging transponder device provide methods and apparatus that effectively, efficiently and economically package a Surface Acoustic Wave (SAW) transponder for use in extreme or dangerous environmental conditions such as those found in and around oil and gas exploration down-hole applications and oil exploration environments as well as in other environments that have extreme conditions. Some embodiments of the invention attach a SAW piezoelectric device directly to an antenna system in a manner that protects both the SAW piezoelectric device as well as its antenna system from surrounding extreme environmental conditions. The SAW piezoelectric device may be contained within a radome, dome structure or protective covering that is hermetically sealed against a bottom side of an antenna substrate. A small amount of a predetermined gas is contained within the dome structure for use by the SAW piezoelectric device. The piezoelectronic device inside the radome may be bonded to a bottom surface of an antenna substrate and provide one or more bond wires that attach to conductive vias, which extend through the antenna substrate to the front side of the antenna substrate and thereby electrically connect the SAW piezoelectric device to one or more antenna elements. The exemplary tagging transponder device may then be molded within an RF transparent potting material such as an epoxy, which forms a casing or covering about the antenna, antenna substrate, SAW, and dome structure to protect them mechanically and environmentally. An exemplary RF transparent potting material used for enclosing or surrounding an exemplary embodiment would be a high strength material that can withstand a wide range of temperatures (e.g., −67° to 662° Fahrenheit), resists direct impacts from other metal or hardened objects, resists corrosive chemicals, and further hermetically seals the inner components from an outer environment. Additionally, embodiments may incorporate components having similar coefficients of thermal expansion in order to help create and maintain monolithic device characteristics for exemplary tagging transponder devices over its expected operating temperature range.

Figure 1:
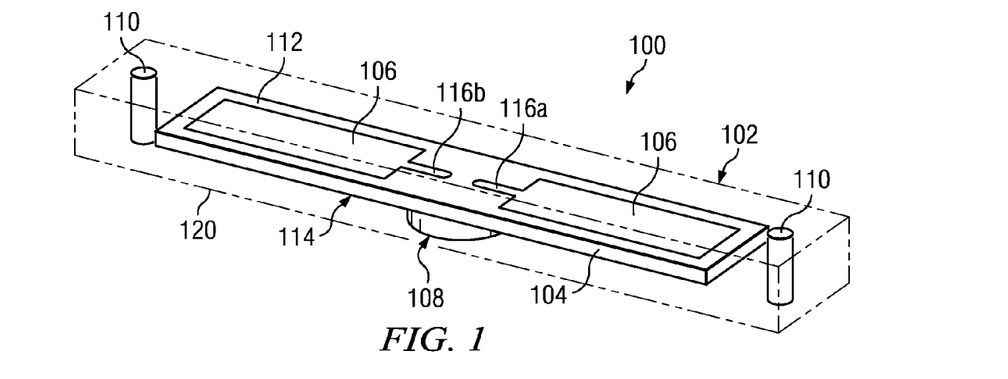
FIG. 1 depicts an exemplary tagging transponder device.

Referring now to FIG. 1, a perspective view of an exemplary assembled and packaged surface acoustic wave transponder or tagging transponder device 100 is depicted. The exemplary tagging transponder device 100 comprises potting material that forms a casing 102, which is molded about the components of the exemplary transponder device 100. The molded casing 102 may be comprised of an RF transparent epoxy, polymer, resin, compound, compounds based on ceramic or inorganic cement systems, epoxy resins, casting resins, potting agents, resin binders, encapsulates, phenolic and formaldehyde resins or acrylic deposits including related facsimiles or derivations thereof.

An antenna substrate 104, which is made of a high-K dielectric material, which in some embodiments comprises a ceramic material, has a substrate top side 112 and a substrate bottom side 114. An antenna substrate 104 may have a length ranging from about 1 inch to about 2 inches and a width ranging from about 0.25 to about 0.5 inches. On the top side 112 of the antenna substrate 104 are antenna elements 106. In this embodiment there are two antenna elements 106 that partially cover a right half side of the top side 112 and a left half side of the top side 112 of the antenna substrate 104. Although the antenna 106 are shown to be rectangular or paddle shaped, alternate embodiments of the invention may have various shaped antenna (e.g., zig zag, spiral, multi-fingered, etc.) based on the frequency or frequencies that the antenna 106 are adapted to receive and/or transmit.

Figure 5:
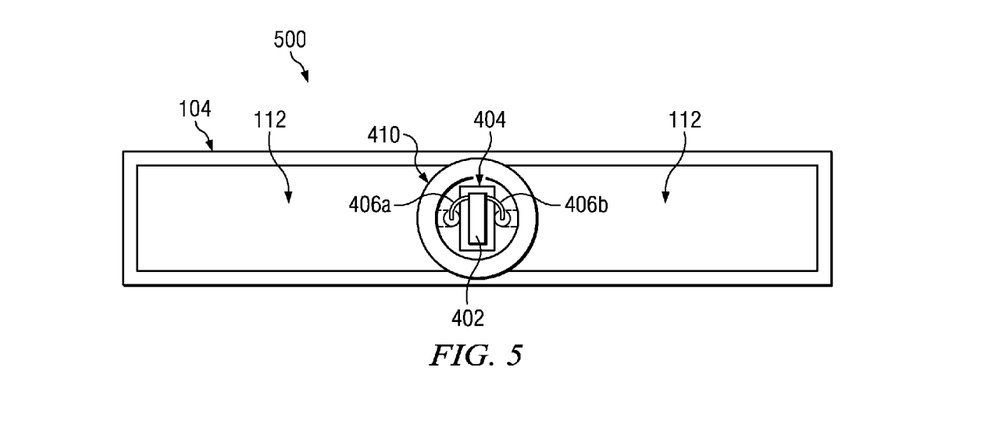
FIG. 5 illustrates another bottom view of an exemplary tagging transponder device without a protective radome installed, but comprising a ground plane on the bottom side of the antenna substrate.

On the substrate bottom side 114, a protective dome structure, covering or radome 108 is attached opposite to the antenna 106 connection locations 116a and 116b. Thus, in some embodiments, the antenna electrical connection portions 116a and 116b may be located near one end of the antenna substrate such that the antenna 106 extend from one end to the other end of the antenna substrate such that the antenna are substantially next to each other or, in some embodiments, only a single antenna is used. In some embodiments, the antenna substrate 104 essentially separates two conductive planes, being the antenna element(s) 106 and an optional ground plane 112 on the substrate bottom side 114, as shown in FIG. 5.

Securing-through-holes 110 extend from the top side 118 of the casing 102 through the casing to the bottom side 120 of the casing 102. One or more securing through holes 110 may be used to secure embodiments of the tagging transponder device 100 within a form factor (discussed below with respect to FIGS. 2A-2E) or directly to a piece of equipment or asset that requires identification tagging.

Figure 2A:
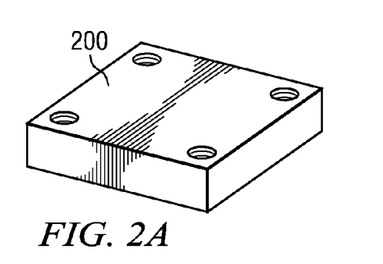
FIGS. 2A-2E illustrate a plurality of exemplary form factors that may incorporate a tagging transponder device in accordance with embodiments of the invention.
Figure 2B:
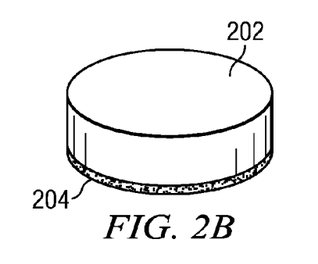
Figure 2C:
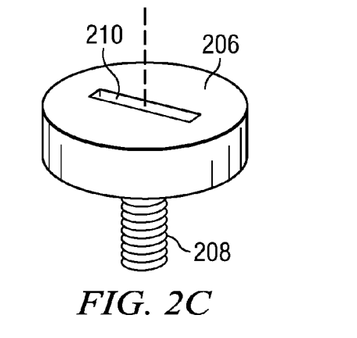
Figure 2D:
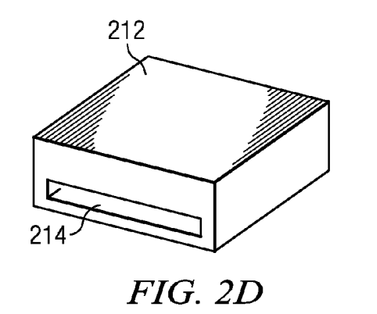
Figure 2E:
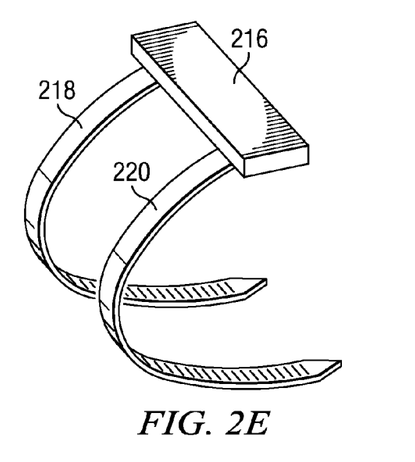

A variety of exemplary shapes and form factors, shown in FIGS. 2A-2E, may be used on different assets and objects so as to anchor or hold an exemplary tagging transponder device to the asset or object being tagged. FIG. 2A depicts a square tag with four screw holes. A tagging transponder device may be installed within the square tag 200 or the square or box shaped tag 200 may be the potted casing 102 encapsulating an exemplary tagging transponder device antenna substrate and its associated components. FIG. 2B depicts a round or cylindrical shaped tag 202 with an adhesive backing 204. Some round tag form factors 202 may not incorporate an adhesive backing, but instead may be glued, compressed or molded into a borehole or other cavity created in an asset, equipment or device that requires identification tagging. FIG. 2C depicts a round tag 206 with a screw portion 208 extending perpendicularity from the round tags axis. A slot to enable a screw driver or other tool to tighten the exemplary round tag form factor to an asset or equipment that requires identification tagging is provided. It's understood that the slot 210 may be of any acceptable shape such as hexagon or other shape used in the industry for enabling the device to be rotated and tightened or screwed into another object. FIG. 2D depicts a square or box type form factor 212 that comprises a slot 214 that extends from one side of the square or cube 212 to another side of the cube 212. The slot may be used to extend a cable tie, also known as a zip tie or tie-wrap, through the slot and about a portion of an equipment or asset that requires identification tagging. FIG. 2E depicts a pipe tag 216 that comprises an elongated portion having two cable ties extending out of a side of the elongated portion such that the cable ties can wrap about a pipe or other structure and then be ratcheted tightly about the structure as the tie wraps 218, 220 are inserted into the opposite side of the elongated portion of the exemplary pipe tag form factor 216. These exemplary form factors provide a small sampling of the multitude of form factors that an exemplary tagging transponder device can be installed into or encapsulated into in accordance with various embodiments of the invention. One of ordinary skill in the art would be able to create additional form factors that could be used to tag various equipment or assets that require identification tagging in accordance with exemplary embodiments of the invention.

Figure 3:
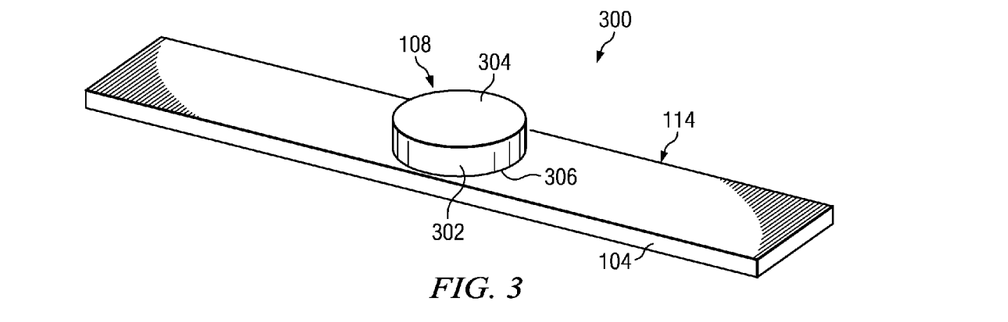
FIG. 3 is a perspective view of an exemplary tagging transponder device without a protective casing.

Referring now to FIG. 3, a perspective view of an exemplary tagging transponder device 300 is depicted without a protective casing. Here the antenna substrate 104 is shown such that the antenna substrate bottom side 114 can be easily viewed. The dome structure, covering or radome 108 is affixed to the bottom side of the antenna substrate 114 such that it is opposite from the antenna electrical connection portions 116A, 116B (not specifically shown in this Figure). The radome 108 may have cylindrical sides 302 and a top surface 304. The cylindrical sides 302 and top surface 304 form an inner cavity (not specifically shown in this figure) that is adapted to contain various components of the exemplary tagging transponder device 300. The radome 108 may be made of various radio frequency transparent materials, not limited to, polyetheretherketone (PEEK) material or other semicrystalline thermo plastic having similar or better mechanical and chemical resistance properties that are retained in high temperature (350° to 400° C.) environments. The radome may have a diameter or width ranging from about 0.3 to about 1 inch across the top surface 304. The radome 108 may be RF transparent for the frequencies transmitted and received in embodiments of the invention. The dome structure, covering or radome 108, may be attached to the bottom side 114 of the antenna substrate 104 using various epoxies, glues, resins, heat welding, ultrasonic welding or other means for creating a gas type hermetic seal between the bottom edge of the radome 108 and the surface of the bottom side 114 of the antenna substrate 104.

In other embodiments, the radome 108 may be made of a metal, a metal alloy, plastics, polymers resins or other materials that are chemically resistant to, for example, sea water, hydrogen sulfide, carbon dioxide, nitrogen, bromine, chloride, down-hole drilling fluids, as well as temperatures ranging from about −55° C. to over 350° C. (−67° to 662° F.). An exemplary metal that might be used for the radome 108 may be a nickel alloy or stainless steel or other electrically conductive metal that meets the necessary criteria. About the bottom edge of the radome 108 may be a circumferential lip that extends radially outward or radially inward from the cylindrical sides 302. The exemplary lip is not specifically shown in FIG. 3, but referring momentarily to FIG. 4, the sealing pad 15 has a radial width that the circumferential lip about the bottom side edges of the protective covering, dome or radome 108 may abut against when being attached thereto for hermetic sealing. An exemplary covering structure or radome may have a height from the base or the cylindrical sides 302 where it attaches to the bottom side 114 of the antenna substrate to the top surface of the structure or radome 304 of between about 0.3 and 0.35 inches.

Figure 4:
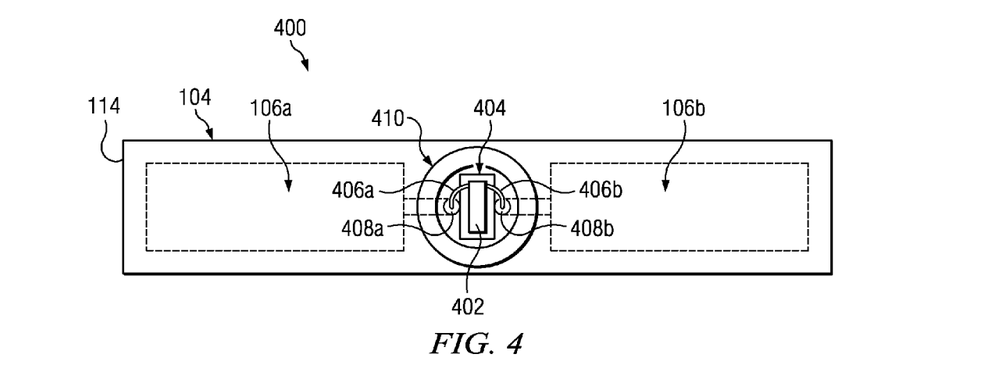
FIG. 4 depicts a bottom view of an exemplary tagging transponder device without a protective radome installed or a ground plane on the bottom side of the antenna substrate.

Referring now to FIG. 4, a bottom view of an exemplary tagging transponder device 400 without a protective dome, covering or radome 108 or ground plane on the bottom side surface 114 of the antenna substrate 104 is depicted. The antenna elements 106A, 106B are shown with dotted outlines because they are on the substrate top side 112 of an exemplary tagging transponder device 400. An SAW piezoelectric device (SAW) 402 is attached to the bottom surface 114 of the antenna substrate 104. The SAW 402 may be attached by a bonding agent 404. The bonding agent 404 may be a high strength adhesive, epoxy, resin, silicon based adhesive or reasonable facsimiles or derivations thereof. Ultimately, the bonding agent 404 must be adapted to hold the SAW piezoelectric device 402 securely in place while an exemplary tagging transponder is in various environments and situations. The SAW device 402 has two wire bond wires 406a and 406b that extend from the SAW device to or through one or more of the vias 408a, 408b. The vias extend from the bottom surface 114 to the top surface 112 of the antenna substrate 104. Thus, the bond wires 406a, 406b are electrically connected via the vias 408a and 408b to the antenna electrical connection portions 116a and 116b (see also FIG. 1). The bonding wires 406a, 406b may be connected to the antenna elements 106a, 106b via solder or otherwise through the vias 108a and 108b. During the soldering process the via or vias 108Aa, 108b may be filled or plugged with solder. The plugging of the vias seals and stops gasses from entering or escaping from the interior of the radome 108 when it is installed. Other materials, such as epoxy, polymers, or crystalline compounds can also be used to plug the vias 408a and 408b.

A sealing pad 410 surrounds the SAW device 402 and the bonding agent 404. The sealing pad is adapted for abutting against the bottom edge or lip 306 of the protective covering or radome's cylindrical sides 302. The sealing pad 410 may comprise a bonding agent similar to the bonding agent 404 used to attach the SAW device 402 to the bottom side of the antenna substrate when a RF transparent radome 108 is utilized. In other embodiments the sealing pad 410 may comprise a plastic, polymer or resin that can be heat welded or ultrasonic welded to the bottom edge or lip 306 of the radome 108. In yet additional embodiments, the sealing pad 410 may be made of a metal or metal alloy that is adapted to be soldered or welded to the bottom edge or lip 306 of the protective covering or radome 108. In all situations, the sealing pad 410, when abutted against the bottom edge or lip 306 of the radome 108 establishes a hermetic seal about the components within the protective covering or radome. The inside height (not specifically shown) of the interior of the protective covering, dome structure or radome must be high enough to create space of 1 to 20 microns or more between the SAW device 402 surface that faces the interior of the radome and the interior surface of the radome.

Referring now to FIG. 5, another bottom view of an exemplary tagging transponder device 500, without a protective cover or radome, but with a ground plane 112 for the antenna system 106a, 106b is depicted. The addition of a ground plane on the bottom surface 114 of the antenna substrate 104 has been found to enhance, in certain environments and antenna designs, the reception and transmission of certain frequencies. The tagging transponder device 500 is similar to the tagging transponder device 400, except for, of course, the ground plane 112 and, in some embodiments, the sealing pad 410. When the radome 108, of an exemplary embodiment is a conductive material, the sealing pad 410 may also be made of a conductive material and be electrically connected to the ground plane 112 such that the radome, if electrically conductive, is effectively at the same potential as the ground plane 112. Conversely, if the radome is a RF transparent radome, and is not electrically conductive, then the sealing pad 410 may also not be conductive or may be conductive (i.e., bonding material). If the sealing pad 410 is conductive, it may be electrically connected to the ground plane 112.

Figure 6:
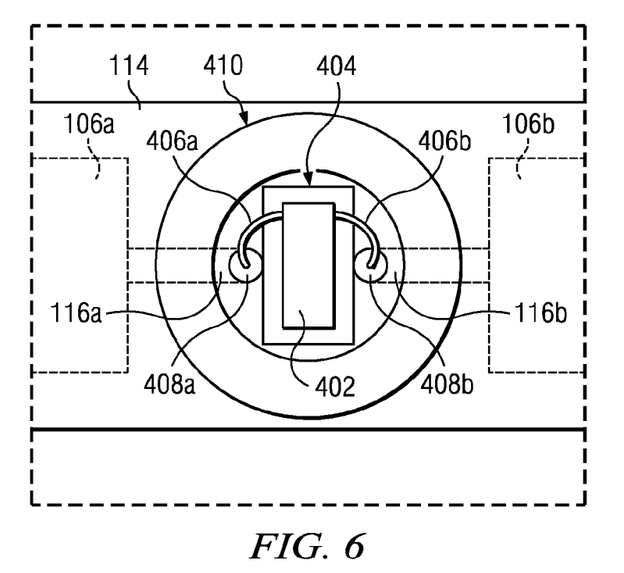
FIG. 6 illustrates a close-up view of a portion of an exemplary tagging transponder device.

FIG. 6 is a close-up view of the central portion of FIG. 4 that provides a clearer view of the bond wires 406a and 406b. Here, the bond wires 406a and 406b and the antenna electrical connection portions 116a and 116b are electrically connected by way of the vias 408a and 408b.

Figure 7:
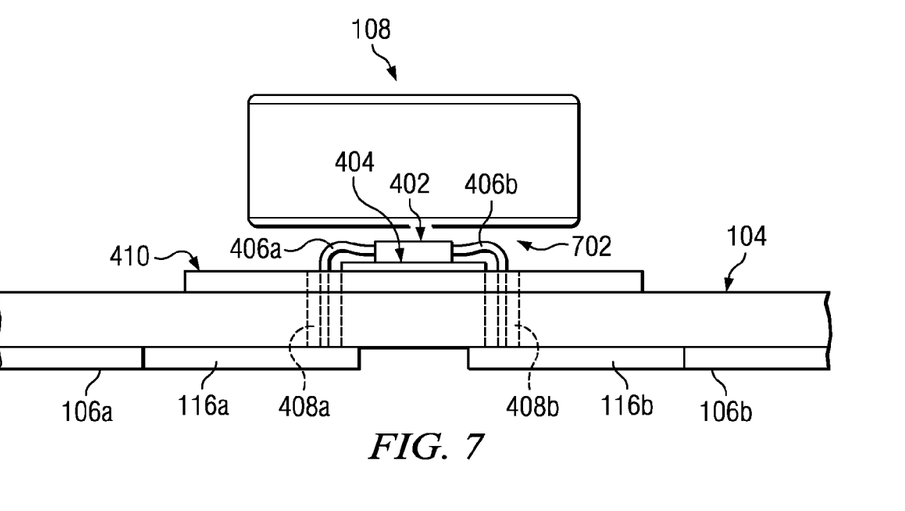
FIG. 7 illustrates a side view of an exemplary portion of an exemplary tagging transponder device providing an indication of how an exemplary surface acoustic wave piezoelectric device is attached relative to a protective radome covering.

Just prior to the dome structure or radome 108 being attached to the sealing pad 410 a puff of a predetermined gas 702 is provided to fill or partially fill the interior of the radome 108 and about the SAW device 402. The predetermined gas 702 may be helium, nitrogen or other gas that exhibits minimal expansion and/or contraction over the operating temperature of an exemplary tagging transponder device.

Referring to the antenna 106a and 106b other exemplary embodiments may comprise other suitable antenna systems such as ceramic patch antennas, flat panel antennas, monopole antennas, dipole antennas, C-slot antennas, E-slot antennas, microchip antennas, patch antennas, choke ring antennas as well as derivations and permutations thereof.

Additionally, embodiments can be manufactured at a reduced cost using silicon based RFID tag devices instead of SAW piezoelectric devices, but the temperature range and durability of the resulting embodiments will be reduced. For example, the operating maximum temperature range may be limited to below 250° C. or less.

When SAW (surface acoustic wave) technology is utilized, embodiments of the invention may have a transmit and receive operating frequency of about 2.45 GHz ISM band (+or −50 MHz). The operating temperature of embodiments of the invention may extend from about −55° C. to about 350° C. (−67° to 662° F.) with a caveat that the high temperature operating temperature is mainly limited by the upper temperatures that the potting material 102, bonding agents 404 (and in some embodiments the sealing pad 410) can withstand without failure. Regardless, the SAW piezoelectric device 402 and the antennas 106a and 106b may operate within the full operating temperature range. Embodiments may be read by SAW device transceiver equipment at a distance of up to about six to eight feet with a 10 dBn SAW reader. When capsulated in a potted casing 102, embodiments may be adapted to withstand vibration of up to about 30 g, sine sweep at 5-1000 Hz as well as shock of 100 g, 1 ms half sine.

Figure 8:
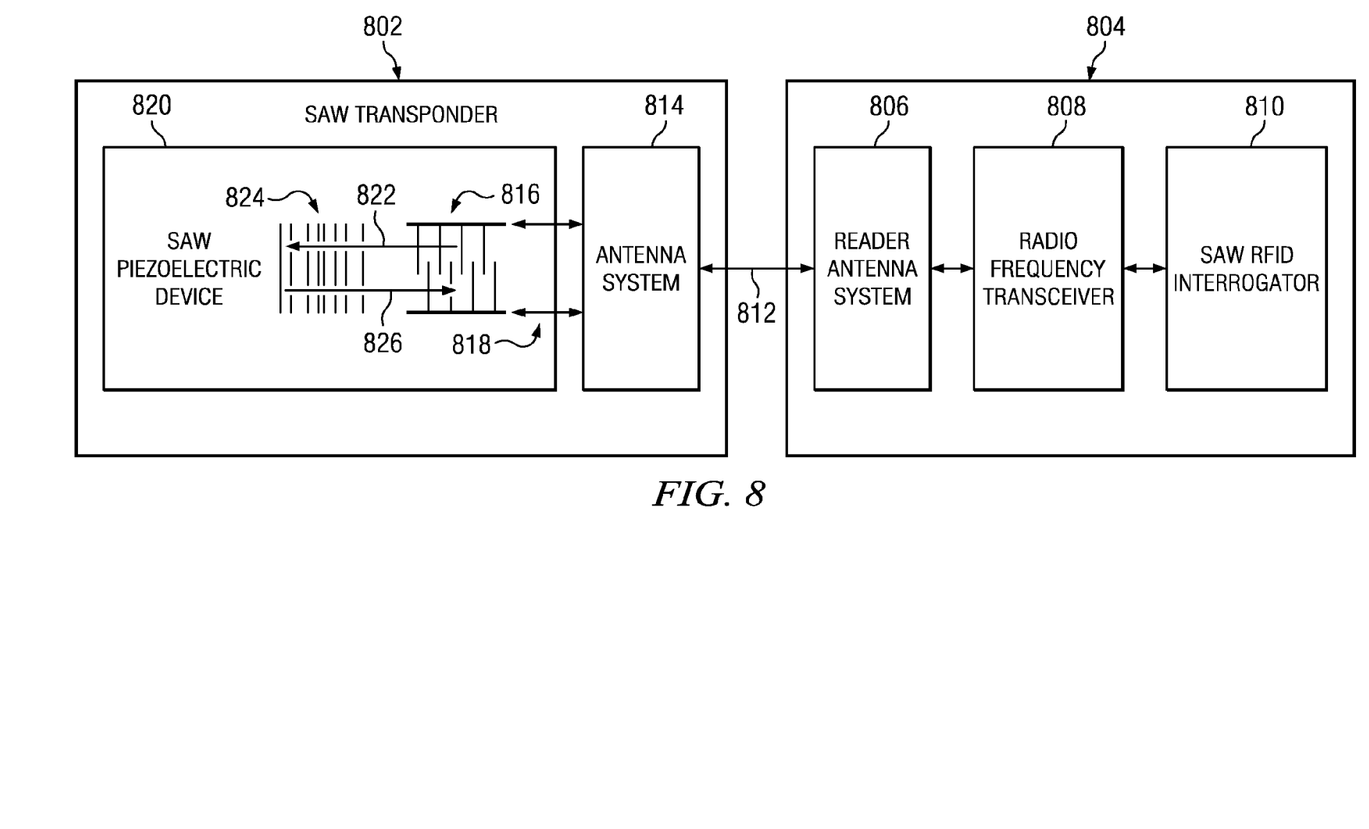
FIG. 8 is a schematic block diagram of an exemplary communication system and method for communicating between an exemplary SAW tagging transponder device and an external SAW interrogation system in accordance with an embodiment of the invention.

Referring now to FIG. 8, a flow diagram and method of an exemplary system 800 that utilizes a SAW piezoelectric device installed in an exemplary tagging transponder device is illustrated. Here, a surface acoustic wave tagging transponder device 802 is depicted interacting with a surface acoustic wave reader or interrogator device 804. A SAW reader or interrogator device 804 may comprise, for example, an antenna system 806, a radio frequency transceiver 808 and a surface acoustic wave radio frequency interrogator 810. Radio frequency energy 812 is exchanged between the transponder antenna system 814 and the reader antenna system 806. The radio frequency energy received at the transponder antenna system 814 is fed to a surface acoustic wave (SAW) inter-digital transducer 816 via connections 818. The connections 818 may coincide, for example, to the bond wires 408a and 408b that electrically connect the exemplary antenna element(s) 106a, 106b to the SAW device 402 or 820 in an exemplary embodiment. In the SAW piezoelectric device 820, the inter-digital transducer 816 converts the radio frequency energy received from an antenna system 814 to a surface acoustic wave 822 (shown as an arrow in the figure), which propagates over the delay lines 824. The delay lines encode the surface acoustic wave 822 into a return acoustic wave signal or data 826. The encoded return acoustic wave signal or data 826 is then converted back into radio frequency energy by the inter-digital transducer 816. The return signal or data in the form of radio frequency energy is then provided to the antenna system 814 by connections 818 and transmitted as a radio frequency 812 back to the reader antenna system 806. The radio frequency transceiver 808 receives the encoded return signal, which is then provided to the SAW RFID interrogator 810 where the encoded return signal is decoded for use by other electronic devices such as an asset inventory system (not specifically shown).

It will be appreciated by those skilled in the art having the benefit of this disclosure that embodiments of the exemplary tagging transponder device packages provides a rugged, sturdy and useful asset and instrument tagging device that can operate for extended periods of time in various, often extreme temperatures, pressures, vibrations, blunt impacts as well as the caustic environments associated with oil and gas exploration sites, mining, chemical processing facilities, space exploration, ocean exploration, military testing and other extreme environments while providing the means for containing data that can be easily read using RF signals to help account for asset identification, usage and inventory. It should be understood that although illustrated embodiments of the invention have been described, the foregoing description is not intended to limit the scope of the invention. Various modifications and combinations of the invention embodiments as well as other embodiments of the invention will be apparent to persons skilled in the art upon reference to the above description and figures. It should further be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art without departing from the underlying concepts and scope hereof, as defined by the following claims. Thus, it is intended that the following claims be interpreted to embrace all such further modifications, changes, rearrangements, substitutions, alternatives, design choices and embodiments.

What is claimed is:

1. A tagging transponder device comprising:
  a surface acoustic wave (SAW) piezoelectric device bonded directly onto a bottom surface of an antenna substrate by a first bonding agent configured to maintain the bond within a temperature range of −67° F. to 662° F.;
  a dome enclosure positioned over the SAW piezoelectric device, the dome enclosure having a bottom dome edge hermetically sealed with a second bonding agent to the bottom surface of the antenna substrate such that the SAW piezoelectric device is hermetically encased within the dome enclosure and the bottom surface of the antenna substrate, the second bonding agent configured to maintain the hermetic seal between the bottom dome edge and the bottom surface over the temperature range of −67° F. to 662° F.;
  a predetermined gas being about the SAW piezoelectric device, the predetermined gas being hermetically encased within the dome enclosure and the bottom surface of the antenna substrate, the predetermined gas being selected from a group consisting of helium, nitrogen and other gases comprising similar minimal expansion characteristics over the temperature range of −67° F. to 662° F.;
  an antenna layer covering a substantial portion of a top surface of the antenna substrate;
  an electrical connection extending from the SAW piezoelectric device, through a via in the antenna substrate and to a portion of the antenna layer, wherein the via is hermetically sealed with a sealing compound such that the gas does not escape from about the SAW piezoelectric device; and
  an outer radio frequency transparent potting material substantially covering the top surface and the bottom surface of antenna substrate as well as the dome enclosure and the antenna layer.

2. The device of claim 1, wherein the tagging transponder device is configured to be incorporated into a plurality of tag form factors adapted to anchor hold the tagging transponder device to a solid asset or object being tagged.

3. The device of claim 1, wherein the antenna layer comprises an antenna electrical connection portion positioned on the top surface of the antenna substrate directly opposite to the dome enclosure.

4. The device of claim 1, wherein the dome enclosure is a radome that is substantially transparent to radio frequencies in the range of 2.45 GHz +/−50 MHz.

5. The device of claim 1, wherein the dome enclosure is conductive.

6. The device of claim 1, further comprising a ground plane positioned on the bottom surface of the antenna substrate and about the dome enclosure.

7. The device of claim 5, wherein the dome enclosure is in conductive contact with a ground plane positioned on the bottom surface of the antenna substrate.

8. The device of claim 1, further comprising a ground plane positioned on the bottom surface of the antenna substrate.

9. The device of claim 1, wherein the SAW piezoelectric device comprises delay lines positioned to uniquely identify the tagging transponder to SAW interrogator device.

10. A tagging transponder device comprising:
  an antenna substrate having a top surface and a bottom surface;
  an antenna layer covering a substantial portion of the top surface, the antenna layer comprising an antenna electrical connection portion;
  at least one via extending from the antenna electrical connection portion through the antenna substrate to the bottom surface of the antenna substrate;
  a surface acoustic wave (SAW) identification device bonded with a first high temperature bonding agent directly to the bottom surface of the antenna substrate adjacent to the at least one via, the SAW identification device comprising at least one bonding wire, the boding wire being electrically connected through the via to the antenna electrical connection portion, the via being hermetically sealed with a hermetic sealing material;
  a dome enclosure covering the SAW identification device, the dome enclosure comprising a bottom edge hermetically sealed with a bonding agent against the bottom surface, the bonding agent comprising an epoxy or resin configured to maintain the hermetic seal between the bottom edge and the bottom surface throughout a temperature range of −67° F. to 662° F.; and a gas, selected from a group consisting of nitrogen and helium, being contained and hermetically sealed between the dome enclosure and the bottom surface.

11. The device of claim 10, further comprising a ground plane on the bottom surface and about the dome enclosure.

12. The device of claim 10, wherein the dome enclosure is made of a conductive material and is hermetically sealed against the bottom surface with the bonding agent, wherein the bonding agent further comprises conductive material.

13. The device of claim 12, further comprising a ground plane on the bottom surface, the ground plane being conductively connected to the dome enclosure through the bonding agent.

14. The device of claim 10, wherein the dome enclosure is substantially transparent to radio frequencies in the range of 2.45 GHz +/−50 MHz.

15. The device of claim 10, further comprising a radio frequency transparent potting material that covers the top surface and the antenna layer as well as the bottom surface and the dome enclosure.

16. The device of claim 15, being configured for incorporation into a tag form factor that is configured to anchor or hold the tagging transponder to a solid asset or object being tagged.

17. A tagging transponder device comprising:
an antenna substrate comprising a top surface and a bottom surface;
a first antenna comprising a first electrical connection on the top surface of the antenna substrate;
a second antenna comprising a second electrical connection on the top surface of the antenna substrate, the first electrical connection being proximate to the second electrical connection;
a SAW tagging device comprising a first connection wire and a second connection wire, the SAW tagging device being bonded with a first bonding agent to the bottom surface of the antenna substrate, the first bonding agent being a high strength adhesive comprising epoxy or resin configured to maintain a bond from −67° F. to 662° F.;
a first via extending through the antenna substrate, the first via being proximate to and electrically connected to the first connection wire, the first via further being electrically connected to the first electrical connection of the first antenna portion, the first via being filled with a hermetically sealing compound configured to hermetically seal the first via;
a second via extending through the antenna substrate, the second via being proximate to and electrically connected to the second electrical connection of the second antenna portion, the second via being filled with the hermetically sealing compound configured to hermetically seal the second via;
a dome structure covering the SAW tagging device, the first via and the second via, the dome structure having a bottom edge that is bonded with a second bonding agent to the bottom surface of the antenna substrate, the second bonding agent hermetically sealing the bottom edge to the bottom surface, the second bonding agent comprising an epoxy or resin configured to maintain the hermetic seal between the bottom edge and the bottom surface throughout a temperature range of −67° F. to 662° F.; and
a predetermined gas selected from a group consisting of nitrogen and helium, the predetermined gas being hermetically sealed between the dome structure and the antenna substrate.

18. The device of claim 17, further comprising a ground plane on the bottom surface of the antenna substrate.

* * * * *